(12) United States Patent
Chang

(10) Patent No.: US 7,334,738 B2
(45) Date of Patent: Feb. 26, 2008

(54) RISER CARD IDENTIFICATION SYSTEM

(75) Inventor: Chao-Huang Chang, Taipei (TW)

(73) Assignee: Inventec Corporation (TW)

( * ) Notice: Subject to any disclaimer, the term of this patent is extended or adjusted under 35 U.S.C. 154(b) by 176 days.

(21) Appl. No.: 11/255,757

(22) Filed: Oct. 21, 2005

(65) Prior Publication Data
US 2007/0094425 A1 Apr. 26, 2007

(51) Int. Cl.
*G06K 19/06* (2006.01)
(52) U.S. Cl. ............................ 235/492; 235/487
(58) Field of Classification Search ............... 235/492, 235/451, 487, 383
See application file for complete search history.

(56) References Cited

U.S. PATENT DOCUMENTS

| 6,401,152 B1 * | 6/2002 | Solomon et al. ............ 710/104 |
| 6,609,170 B1 * | 8/2003 | Lehwalder et al. ......... 710/301 |
| 6,611,912 B1 * | 8/2003 | Maleck et al. ............. 713/100 |
| 2003/0070023 A1 * | 4/2003 | Barmore ..................... 710/300 |
| 2006/0065721 A1 * | 3/2006 | Addison et al. ............ 235/383 |

* cited by examiner

*Primary Examiner*—Thien M. Le
*Assistant Examiner*—Edwyn Labaze
(74) *Attorney, Agent, or Firm*—Peter F. Corless; Steven M. Jensen; Edwards Angell Palmer & Dodge LLP

(57) ABSTRACT

A riser card identification system identifies a riser card electrically connected with a computer system having a BIOS and a storage unit. The system includes a setting unit, a signal generating unit for generating a waveform signal according to a control signal output by the computer system, a charging/discharging unit built inside the riser card for performing a charging/discharging process to convert the waveform signal into an analog signal, a signal comparing unit for comparing the analog signal with a reference signal output by the computer system and generating a digital signal, and a signal reading unit for reading duty cycle of the digital signal. The charging/discharging unit has a characteristic value as an identification mark of the riser card corresponding to the charging/discharging unit. Therefore, the BIOS is able to identify the riser card according to the read duty cycle and information stored in the storage unit.

9 Claims, 6 Drawing Sheets

| Riser card | riser card mark | duty cycle(%) |
|---|---|---|
| first riser card | RC0 | 10 |
| second riser card | RC1 | 20 |
| third riser card | RC2 | 50 |
| ... | ... | ... |

FIG. 6

RISER CARD IDENTIFICATION SYSTEM

FIELD OF THE INVENTION

The present invention relates to a riser card identification technology, and more particularly, to a riser card identification system allowing a computer system to identify a variety of riser cards electrically connected with the computer system.

DESCRIPTION OF THE RELATED ART

With explosive development of the electronic industry, electronic products including computer systems such as servers or computers have become the mainstream. To meet demands required by clients for extensibility, a plurality of riser card slots are usually disposed in the electronic products for insertion of a variety of riser cards such that these riser cards can be connected with the electronic products to promote the performance of the electronic products. However, a basic input/output system (BIOS) of an electronic product having a plurality of riser cards has to have the capability to correctly identify each of the riser cards for further corresponding operation.

Currently, there are two kinds of methods to identify riser cards. According to the first method, the basic input/output system (BIOS) of a computer system identifies riser cards through GPIO pins disposed on the riser card slots. For example, if the value of a GPIO pin disposed on a riser card slot is "0", the corresponding riser card is identified to be a riser card of a first model; otherwise, if the value of the GPIO pin is "1", the corresponding riser card is identified to be another riser card of a second model. Although the first method is quite simple, one GPIO pin can be used to identify only two riser cards. To identify four riser cards, two GPIO pins are needed. As a result, to identify much more riser cards, the number of GPIO pins has to be increased accordingly. Thereby manufacturing cost is increased and the circuit board becomes quite complex.

The second method makes the use of an I2C bus expender to identify card risers. The second method installs two signal pins on the card riser slots of the computer system, and makes the use of the I2C bus expender to expand one I2C bus into four I2C buses such that a plurality of riser cards can be disposed and identified by the BIOS of the computer system. However, the additionally installed I2C bus expender is much expensive, thereby increasing manufacturing cost.

SUMMARY OF THE INVENTION

According to the above defects, a primary objective of the present invention is to provide a riser card identification system with lower cost.

Another objective of the present invention is to provide a riser card identification system without the need of adding hardware to the current computer system.

A further objective of the present invention is to provide a riser card identification system with simple design.

To achieve the above and other objectives, the present invention discloses a riser card identification system used to identify the riser cards attached to a computer system having a BIOS and a storage unit. The riser card identification system includes a setting unit for allowing users to set an identification mark for at least one riser card and a duty cycle of a pulse signal corresponding to the identification mark, and for saving the identification mark and the corresponding duty cycle to the storage unit of the computer system; a signal generating unit for generating a waveform signal, a duty cycle of which corresponding to a control signal output by the computer system; a charging/discharging unit built inside the riser card forperforming a charging/discharging process to convert the waveform signal output from the signal generating unit into an analog signal, the charging/discharging unit having a characteristic value as an identification mark of the riser card corresponding to the charging/discharging unit; a signal comparing unit for comparing the analog signal output from the charging/discharging unit with a reference signal output by the computer system and for generating a digital signal; and a signal reading unit for reading a duty cycle of the digital signal output from the signal comparing unit such that the BIOS of the computer system is able to identify the riser card according to the duty cycle read by the signal reading unit and information stored in the storage unit.

The above storage unit is an erasable programmable read only memory (EPROM), an electrical erasable programmable read only memory (EEPROM), or a flash read only memory (Flash ROM) of the computer system.

The signal generating unit is a pulse width modulation signal generator capable of generating waveform signals having different duty cycles according to different control signals output by the computer system.

The charging/discharging unit is built inside the computer system and includes a resistor component and a capacitor component. The signal generated by the signal generating unit passes through the resistor component and charges/discharges the capacitor component, thereby generating an analog signal. In the present invention, values of the resistor component and the capacitor component built inside a riser card function as an identification mark of the riser card.

The signal comparing unit compares the analog signal generated by the charging/discharging unit and the reference signal output by the computer and generates a digital signal, which is then transmitted to the signal reading unit for further process. Therein, when the analog signal is smaller than the reference signal continuously, the signal comparing unit generates a digital signal having a low voltage level continuously, a duty cycle of which is not able to be read by the signal reading unit, and accordingly, the computer system is not able to identify the riser cards connected with the computer system; when the analog signal is larger than the reference signal continuously, the signal comparing unit generates a digital signal with a high voltage level continuously, a duty cycle of which is not able to be read by the signal reading unit, and accordingly, the computer system is not able to identify the riser cards connected with the computer system; when the analog signal fluctuates around the reference signal, the signal comparing unit generates a waveform digital signal, a duty cycle of which is identical to the duty cycle of the waveform signal generated by the signal generating unit and is able to be read by the signal reading unit. As a result, the BIOS of the computer system is able to identify the riser cards connected with the computer system.

The signal reading unit reads a duty cycle of the digital signal generated by the charging/discharging unit and sends the value of the duty cycle to the computer system for further process by the BIOS of the computer system.

The basic circuit construction of the riser card identification system is composed of a fan control circuit already existed in the computer system which functions as the signal generating unit and the signal reading unit, a resistor capacitor charging/discharging circuit built inside the plurality of riser cards and composed of a resistor component and a capacitor component, and a comparator. Compared with the prior art that identifies the riser cards by multiple GPIO pins or an expensive chip of I2C bus expender, the present invention needs not add new hardware to the computer system, thereby simplifying the design and reducing cost.

Other aspects and features will become apparent to those ordinarily skilled-in the art upon review of the following description of the preferred embodiments of the present invention in conjunction with the accompanying drawings.

BRIEF DESCRIPTION OF THE DRAWINGS

FIG. 6 is a table showing relationship between the riser card marks and the duty cycles.

DESCRIPTION OF PREFERRED EMBODIMENTS

Figure 1:
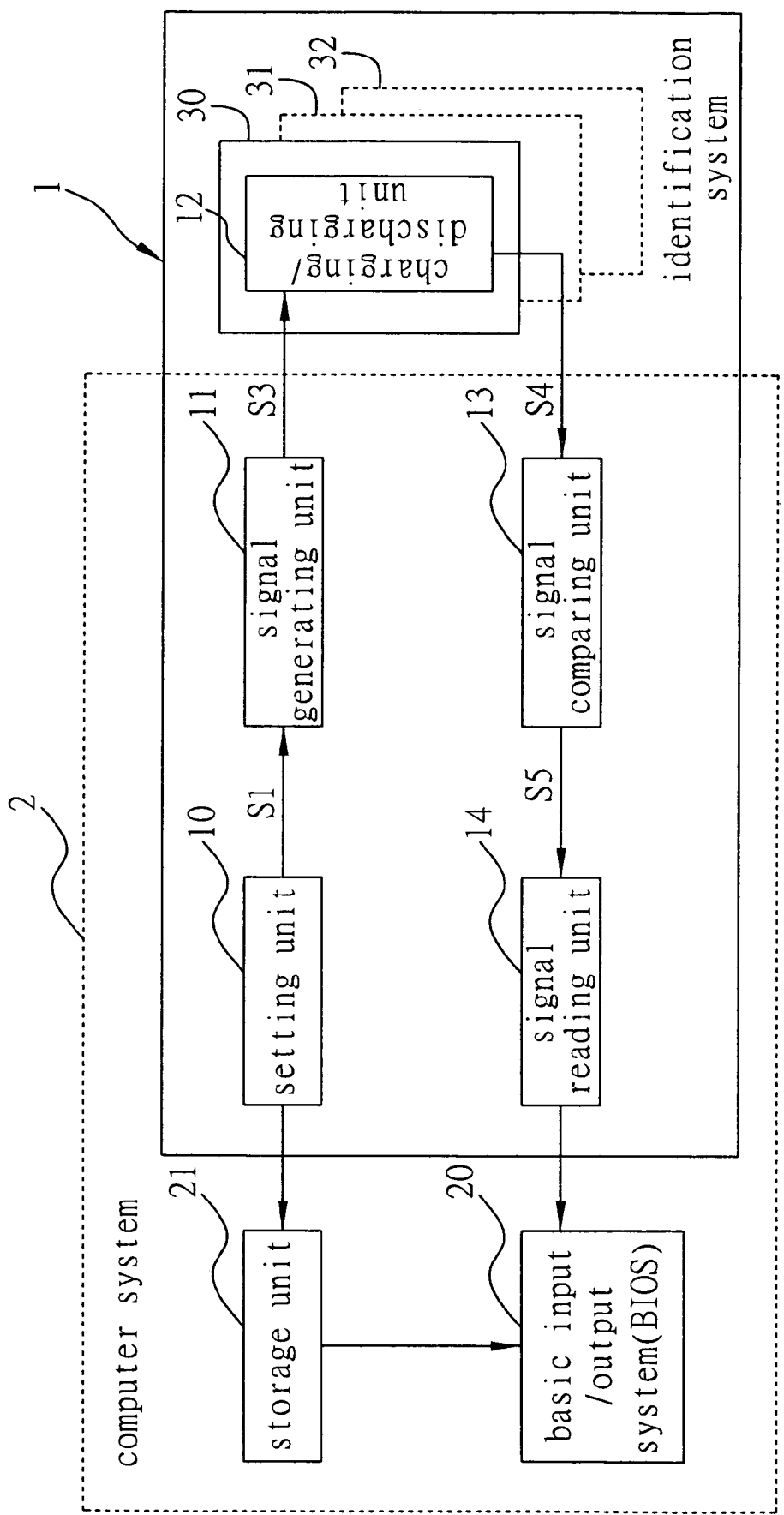
FIG. 1 is a block diagram showing application construction of a riser card, identification system of the present invention.

Referring to FIG. 1, a riser card identification system 1 of the present invention is able to be applied to a computer system 2 comprising a basic input/output system (BIOS) 20 and a storage unit 21 for identifying a plurality of riser cards 30, 31, 32 attached to the computer system 2. The storage unit 21 could be an erasable programmable read only memory (EPROM), an electrical erasable programmable read only memory (EEPROM) or a flash read only memory (Flash ROM).

As shown in FIG. 1, the riser card identification system 1 comprises a setting unit 10, a signal generating unit 11, a charging/discharging unit 12, a signal comparing unit 13 and a signal reading unit 14.

The setting unit 10 allows users to set an identification mark for each of the riser cards 30, 31 and 32, i.e. a characteristic value of each of the charging/discharging units 12 corresponding to the riser cards 30, 31 and 32, and to set a duty cycle of a pulse signal corresponding to the identification mark. As shown in FIG. 6, the setting unit 10 provides a relationship table 4 between the identification marks and the duty cycles, and further saves the relationship table 4 into the storage unit 21 of the computer system 2.

Figure 2:
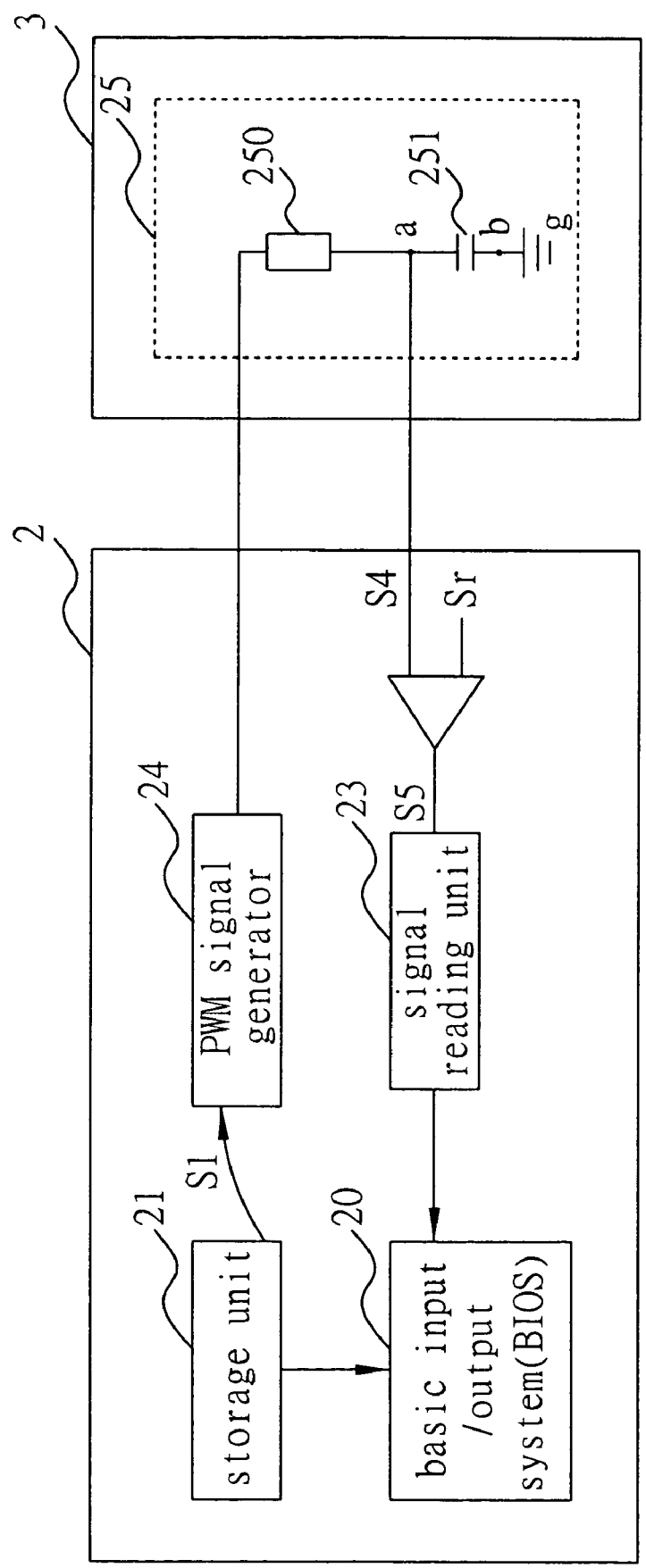
FIG. 2 is a block diagram showing a basic circuit construction of the riser card identification system shown in FIG. 1.

The signal generating unit 11 generates a square wave signal S3 in accordance with a control signal S1 output by the computer system 2. In the present embodiment, as shown in FIG. 2, the signal generating unit 11 is a pulse width modulation (PWM) signal generator, which generates a PWM signal in accordance with the control signal S1 output by the setting unit 10. It should be noted that the signal generating unit 11 is not limited to a PWM signal generator. An electronic component or an electronic circuit could be used as the signal generating unit 11 as long as they meet the requirement of the signal generating unit 11. Moreover, the signal generating unit 11 generates a variety of square wave signals S3 having different duty cycles according to the control signal S1 output by the computer system 2. After the square signals S3 are processed by the charging/discharging unit 12 and the signal comparing unit 13, the signal reading unit 14 reads a duty cycle from these processed square signals S3, thereby allowing the BIOS 20 of the computer system 2 to identify the riser cards attached to the computer system 2. In the present embodiment, the charging/discharging unit 12 is built inside the riser card 30. The charging/discharging unit 12 has a characteristic value which is used to correspond to an identification mark of a corresponding riser card. It should be noted that all the charging/discharging units have characteristic values different from each other and accordingly each riser card has only one identification mark. After processed by the charging/discharging unit 12, the square wave signal S3 is converted into an analog signal S4.

The signal comparing unit 13 compares the analog signal S4 output from the charging/discharging unit 12 with the reference signal Sr to generate a digital signal S5, as shown in FIG. 2. Therein, when the analog signal S4 is continuously smaller than the reference signal Sr, the signal comparing unit 13 generates the digital signal S5 with a low voltage level continuously. When receiving the continuously low-leveled digital signal S5, the signal reading unit 14 is not able to read the duty cycle of the digital signal S5 and, accordingly, the computer system 2 is not able to identify the riser cards connected with the computer system 2. On the other hand, when the analog signal S4 is larger than the reference signal Sr continuously, the signal analog unit 13 generates the digital signal S5 with a high voltage level continuously instead, which is further transmitted to the signal reading unit 14. When receiving the continuously high-leveled digital signal S5, the signal reading unit 14 is not able to read the duty cycle of the digital signal S5 and, accordingly, the computer system 2 is not able to identify the riser cards connected with the computer system 2. When the analog signal S4 fluctuates around the reference signal Sr, the signal comparing unit 13 generates a square wave signal having a duty cycle the same as the duty cycle of the square wave signal S3, which is further transmitted to the signal reading unit 14. Then the signal reading unit 14 reads the duty cycle of the square wave signal S3 and, subsequently, the BIOS 20 of the computer system 2 identifies the riser cards connected with the computer system 2 according to the duty cycle value read by the BIOS 20 and the information stored in the storage unit 21.

In the present embodiment, the above-mentioned signal comparing unit 13 is a signal comparator, which can be replaced by an electronic component or electronic circuit having similar function.

The signal reading unit 14 reads the duty cycle of the digital signal S5 generated by the signal comparing unit 13 so that the BIOS 20 of the computer system 2 is able to identify the riser card corresponding to the duty cycle read by the signal reading unit 14.

FIG. 2 is a block diagram showing a basic circuit construction of the riser card identification system 1 that is applied to the computer system 2. It should be noted that only related components are shown in the drawing. The circuit construction could be more complex or changed according to practical designs. Moreover, in the present embodiment, the computer system 2 generates the control signal S1 according to the information stored in the storage unit 21. Further, in the present embodiment, a fan control circuit already existed in the current computer system 2 is used, wherein the PWM signal generator 24 of the fan control circuit functions as the signal generating unit 11 and the signal reading unit 23 functions as the signal reading unit 14. The signal generated by the PWM signal generator 24 could switch between different duty cycles according to the control signal sent by the computer system 2. Since the fan control circuit is the prior art, detailed description is hereby omitted.

As shown in FIG. 2, the basic circuit construction of the riser card identification system 1 comprises the PWM signal generator 24, a resistor capacitor charging/discharging circuit 25 (abbreviated as "RC charging/discharging circuit" in the following paragraphs) composed of a resistor component 250 and a capacitor component 251, the signal comparator 22 and the signal reading unit 23.

In the present embodiment, the computer system 2 controls the PWM signal generator 24 to generate PWM signals having different duty cycles.

The RC charging/discharging circuit 25 is built inside the riser card 3 which is connected with the computer system 2 through a riser slot (not shown). The RC charging/discharging circuit 21 is composed of the resistor component 250 and the capacitor component 251, wherein one end "a" of the capacitor component 251 is connected with the resistor component 250 and the other end "b" of the capacitor component 251 is connected with the ground "g". In the present embodiment, the PWM signal travels through the resistor component 250 to charge and discharg the capacitor component 251 such that the analog signal S4 is generated at the end "a" of the capacitor component 251. It should be noted that each RC charging/discharging circuit 25 corresponding to a riser card has one and only characteristic value, i.e. RC value. As shown in FIG. 6, the RC charging/discharging circuit 25 built inside a first riser card of the computer system has a characteristic value of RC0, the RC charging/discharging circuit 25 built inside a second riser card of the computer system has a characteristic value of RC1 and the RC charging/discharging circuit 25 built inside a third riser card of the computer system has a characteristic value of RC2.

The signal comparator 22 compares the analog signal S4 output from the RC charging/discharging circuit 25 with the reference signal Sr to generate a signal S5.

The signal reading unit 23 reads the duty cycle of the signals generated by the signal comparator 22, thereby allowing the BIOS 20 of the computer system 2 to identify a riser card according to the reading result and the relationship table 4 stored in the storage unit 21.

Figure 3A:
FIGS. 3a to 3c are three waveform diagrams respectively showing a signal generated by a signal generating unit with a duty cycle of 10%, an analog signal after the signal output from the signal generating unit passing through a charging/discharging unit, and a digital signal generated by comparing the analog signal with a reference signal.
Figure 3B:
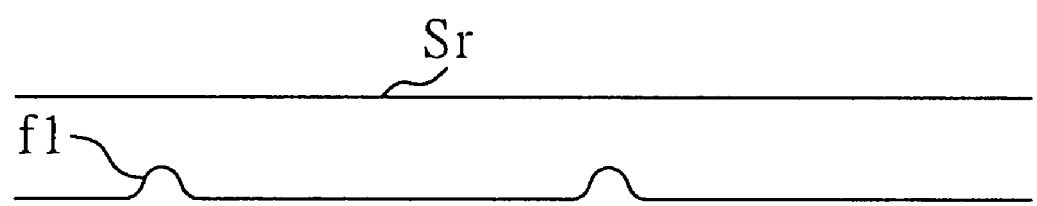
Figure 3C:

As shown in FIGS. 3a to 3c, after passing through the RC charging/discharging circuit 25, a PWM signal having a duty cycle of 10% generated by the PWM signal generator 24 is converted into an analog signal f1. Because the analog signal f1 is smaller than the reference signal Sr continuously, the signal comparator 22 generates a signal f2 with a low voltage level continuously. Because the signal reading unit 23 is not able to read the duty cycle of such the continuously low-leveled signal f2, the computer system 2 has no way to identify the riser cards connected with it.

Figure 4A:
FIGS. 4a to 4c are three waveform diagrams respectively showing a signal generated by the signal generating unit with a duty cycle of 50%, an analog signal after the signal output from the signal generating unit passing through the charging/discharging unit, and a digital signal generated by comparing the analog signal with the reference signal.
Figure 4B:
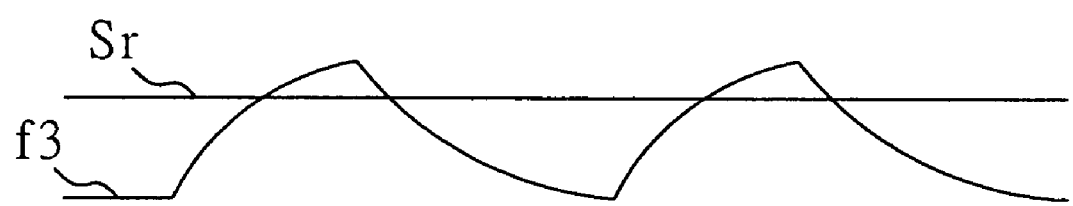
Figure 4C:

As shown in FIGS. 4a to 4c, after passing through the RC charging/discharging circuit 25, a PWM signal having a duty cycle of 50% generated by the PWM signal generator 24 is converted into an analog signal f3. Because the analog signal f3 fluctuates around the reference signal Sr, the signal comparator 22 generates a square wave signal f4 having a duty cycle the same as that of the PWM signal. Because the signal reading unit 23 is not able to read duty cycle of the signal f4, the BIOS 20 of the computer system 2 identifies the riser cards connected with the computer system according to the duty cycle read by the signal reading unit 23 and the information stored in the storage unit 21.

Figure 5A:
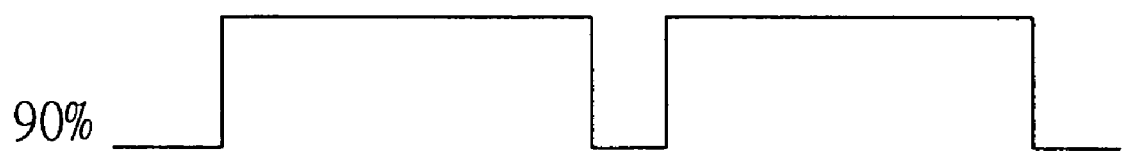
FIGS. 5a to 5c are three waveform diagrams respectively showing a signal generated by the signal generating unit with a duty cycle of 90%, an analog signal after the signal output from the signal generating unit passing through the charging/discharging unit, and a digital signal generated by comparing the analog signal with the reference signal.
Figure 5B:
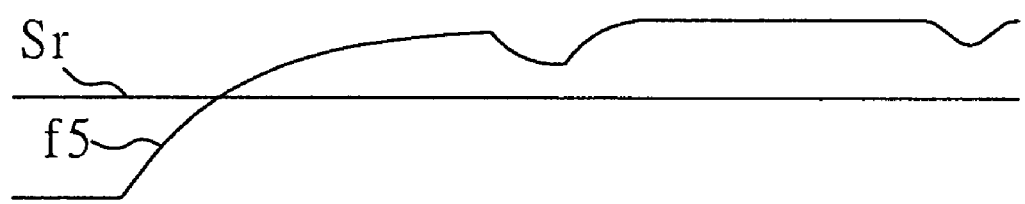
Figure 5C:
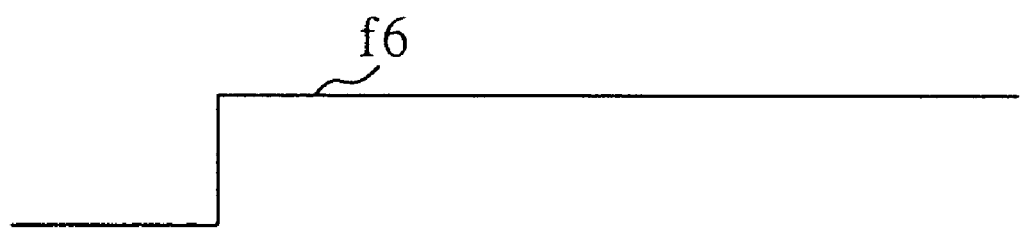

As shown in FIGS. 5a to 5c, after passing through the RC charging/discharging circuit 25, a PWM signal having a duty cycle of 90% generated by the PWM signal generator 24 is converted into an analog signal f5. Because the analog signal f5 is larger than the reference signal Sr continuously, the signal comparator 22 generates a signal f6 with a high voltage level continuously. Because the signal reading unit 23 is not able to read duty cycle of the signal f6, the computer system 2 has no way to identify the riser cards connected with it.

The signal reading unit 23 reads the signals f2, f4, f6 generated by the signal generator 22, and transmits the read signals to the computer system 2. Therefore, the BIOS 20 of the computer system 2 is able to identify the riser card, which corresponds to the duty cycle, according to the read signals and the relationship table 4 stored in the storage unit 21.

Therefore, the present invention changes the signals read by the signal reading unit 23 to have the high voltage level or the low voltage level by switching the duty cycles (0%-100%) of the PWM signals generated by the PWM signal generator 24. Further, the present invention identifies the variety of riser cards currently attached to the computer system 2 according to the duty cycles of the waveform signals read by the signal reading unit 23 and the relationship table 4.

In contrast to the prior art, which needs a large number of GPIO pins to identify a plurality of riser cards, the riser card identification system 1 composed of the fan control circuit already existed in the computer system 2, the RC charging/discharging circuit 25 and the signal comparator 22 is much simpler and cost-efficient.

Further, in contrast to the prior art, which needs an expensive IC chip of I2C bus expender to identify a plurality of riser cards, the riser card identification system 1 of the present invention costs less, because the riser card identification system 1 is able to identify a plurality of riser cards attached to the computer system 2 by comprising only the RC charging/discharging circuit 25.

Although the present invention has been described in accordance with the embodiments shown, it would be appreciated by those skilled in the art that changes may be made without departing from the spirit and principles of the present invention.

What is claimed is:

1. A riser card identification system for identifying a riser card electrically connected with a computer system having a Basic Input Output System (BIOS) and a storage unit, the riser card identification system comprising:
   a setting unit for allowing users to set an identification mark for at least one riser card and duty cycle of a pulse signal corresponding to the identification mark, and for saving the identification mark and the corresponding duty cycle to the storage unit of the computer system;

a signal generating unit for generating a variety of waveform signals with different duty cycles according to a control signal output by the computer system;

a charging/discharging unit built inside the riser card for receiving the waveform signals and performing a charging/discharging process on the received waveform signals, so as to generate analog signals, the charging/discharging unit having a characteristic value as the identification mark of the riser card corresponding to the charging/discharging unit;

a signal comparing unit for comparing the analog signals output from the charging/discharging unit with a reference signal output by the computer system, and generating a digital signal according to the comparison between the analog signals and the reference signal; and a signal reading unit for reading duty cycle of the digital signal output from the signal comparing unit such that the BIOS of the computer system identifies the riser card being electrically connected with the computer system according to the read duty cycle and information stored in the storage unit.

2. The riser card identification system of claim 1, wherein the signal generating unit is one of a group consisting of an electronic component and an electronic circuit, both of which generate a pulse width modulation (PWM) signal according to the control signal output by the computer system.

3. The riser card identification system of claim 2, wherein the group comprises a pulse width modulation (PWM) signal generator.

4. The riser card identification system of claim 1, wherein the charging/discharging unit is a charging/discharging circuit composed of a resistor component and a capacitor component, values of the resistor component and the capacitor component being the characteristic value of the charging/discharging circuit.

5. The riser card identification system of claim 1, wherein the charging/discharging unit has a characteristic value corresponding to the riser card set by the setting unit.

6. The riser card identification system of claim 1, wherein the signal comparing unit is a signal comparator for comparing the analog signals output from the charging/discharging unit with the reference signal.

7. The riser card identification system of claim 6, wherein when the analog signal is continuously smaller than the reference signal, the signal comparator generates a digital signal having a low voltage level continuously, to disable the signal reading unit to read the duty cycle of the digital signal, and to disable the BIOS of the computer system to identify the riser card electrically connected with the computer system.

8. The riser card identification system of claim 6, wherein when the analog signal is continuously larger than the reference signal, the signal comparator generates a digital signal having a high voltage level continuously, to disable the signal reading unit to read the duty cycle of the digital signal, and to disable the BIOS of the computer system to identify the riser card electrically connected with the computer system.

9. The riser card identification system of claim 6, wherein when the analog signal fluctuates around the reference signal, the signal comparator generates and sends to the signal reading unit a waveform signal having duty cycle the same as duty cycle of the waveform signals generated by the signal generating unit such that the signal reading unit reads the duty cycle of the digital signal, thereby the BIOS of the computer system identifies the riser card electrically connected with the computer system according to the duty cycle read by the signal reading unit and the information stored in the storage unit.

* * * * *